United States Patent [19]
Kubota

[11] Patent Number: 5,815,296
[45] Date of Patent: Sep. 29, 1998

[54] OPTICAL COMMUNICATION METHOD FOR PERFORMING COMMUNICATION USING A PLURALITY OF WAVELENGTHS, AND OPTICAL COMMUNICATION SYSTEM FOR PERFORMING COMMUNICATION USING A PLURALITY OF WAVELENGTHS

[75] Inventor: Ouichi Kubota, Atsugi, Japan

[73] Assignee: Canon Kabushiki Kaisha, Tokyo, Japan

[21] Appl. No.: 648,488

[22] Filed: May 15, 1996

[30] Foreign Application Priority Data

May 17, 1995 [JP] Japan .................................... 7-118495

[51] Int. Cl.$^6$ .......................... H04J 14/02; H04B 10/06
[52] U.S. Cl. ........................ 359/133; 359/124; 359/193; 359/194
[58] Field of Search .................................. 359/124, 125, 359/133, 134, 189, 193, 194, 195

[56] References Cited

U.S. PATENT DOCUMENTS

| | | | |
|---|---|---|---|
| 5,239,400 | 8/1993 | Liu .......................................... | 359/125 |
| 5,365,361 | 11/1994 | Noll et al. ............................... | 359/125 |
| 5,408,349 | 4/1995 | Tsushima et al. ....................... | 359/124 |
| 5,504,608 | 4/1996 | Neeves et al. .......................... | 359/124 |
| 5,594,577 | 1/1997 | Majima et al. .......................... | 359/124 |
| 5,596,436 | 1/1997 | Sargis et al. ............................ | 359/125 |
| 5,654,814 | 8/1997 | Ouchi et al. ............................ | 359/193 |

OTHER PUBLICATIONS

Long cavity λ4 Shifted MQW–DFB Laser With Three Electrodes, Yuji Kotaki et al. IEICE Technical Report; vol. 89, No. 329; pp. 60–66; dated Dec. 8, 1989.

Miller, et al., "Passively Temperature–Compensated Fibre Fabry–Perot Filter and Its Application in Wavelength Division Multiple Access Computer Network", Electronics Letters, vol. 26, No. 25 (1990), pp. 2122–2123.

Kotaki, et al., 1.55 μm Wavelength Tunable FBH–DBR Laser, Electronics Letters, vol., 23, No. 7 (1987), pp. 325–327.

Frenkel, et al. "Angle–Tuned Etalon Filters for Optical Channel Selection in High Density Wavelength Division Multiplexed Systems", Journal of Lightwave Technology, vol. 7, No. 4 (1989), pp. 615–624.

Hirabayashi, et al., "Tunable Liquid–Crystal Fabry–Perot Interferometer Filter for Wavelength–Division Multiplexing Communication Systems", Journal of Lightwave Technology, vol. 11, No. 12 (1993), pp. 2033–2043.

*Primary Examiner*—Leslie Pascal
*Attorney, Agent, or Firm*—Fitzpatrick, Cella, Harper & Scinto

[57] ABSTRACT

In an optical communication system in which a plurality of optical nodes are connected via an optical transmission path and communication is performed by multiplexing a plurality of channels in the optical transmission path, transmission is performed by a transmitting optical node using a wavelength belonging to a wavelength group constituting a single channel. Each of the plurality of channels is constituted by a wavelength group consisting of a plurality of wavelengths separated from each other by a predetermined first wavelength interval. Reception is performed by a receiving optical node which detects a light transmitted in the optical transmission path and which has a plurality of light detectivity peaks separated by intervals corresponding to a natural number multiple of the predetermined first wavelength interval so that the light detectivity peaks match with the wavelengths constituting the wavelength group of a required channel.

14 Claims, 10 Drawing Sheets

OPERATION 1-1 : PREPARATION FOR TRANSMISSION 1

OPERATION 1-2 : PREPARATION FOR TRANSMISSION 2

OPERATION 1-3 : START OF TRANSMISSION

OPTICAL COMMUNICATION METHOD FOR PERFORMING COMMUNICATION USING A PLURALITY OF WAVELENGTHS, AND OPTICAL COMMUNICATION SYSTEM FOR PERFORMING COMMUNICATION USING A PLURALITY OF WAVELENGTHS

BACKGROUND OF THE INVENTION

1. Field of the Invention

The present invention relates to an optical communication for performing a communication using a plurality of wavelengths.

2. Related Background Art

In a wavelength multiplex optical communication method, optical signals having different wavelengths are transmitted on a single transmission path to improve the utilization efficiency of the transmission path. Normally, such a system is constituted by a plurality of terminals for transmitting optical signals having different wavelengths, an optical power multiplexer means for outputting such optical signals onto the transmission path, a wavelength separation means for separating only a required wavelength from a wavelength-multiplexed signal, and a plurality of terminals for receiving the signals.

This system mainly uses a semiconductor laser (to be abbreviated as an LD hereinafter) as a light source arranged in each terminal station, an optical fiber as the transmission path, an optical power multiplexer, which is constituted by a half mirror or a light waveguide, as the optical power multiplexer means, and an optical wavelength filter (to be referred to as an optical filter hereinafter) as the wavelength separation means.

As a transmission/reception method, the following methods are available: a method in which the transmit wavelength of the transmitting side is fixed, and the receive wavelength of the receiving side is variable, so that the receiving side selects a desired wavelength; a method in which the receive wavelength of the receiving side is fixed, and the transmit wavelength of the transmitting side is variable, so that the transmitting side selects a wavelength to be received by a desired destination; a method in which both the wavelengths of the transmitting and receiving sides are variable; and the like.

As an example of an LD that can change the wavelength, a DFB (Distributed Feed Back)-LD described in OQE89-116, "Three-electrode length resonator $\lambda/4$ shift MQW-DFB laser", The Institute of Electronics, Information and Communication Engineers, is known. As an optical filter that can extract a desired wavelength from the wavelength-multiplexed optical signal, an FFP (Fiber Fabry Perot) filter described in "PASSIVELY TEMPERATURE-COMPENSATED FIBRE FABRY-PEROT FILTER AND ITS APPLICATION IN WAVELENGTH DIVISION MULTIPLE ACCESS COMPUTER NETWORK", Electronics Letters, 1990, Vol. 26, No. 25, pp. 2122–2123 is known.

The FFP filter has a plurality of transmittance peaks, and its optical frequency interval is generally called an FSR (Free Spectral Range). On the other hand, the ratio between the FSR and the mesial width (to be referred to as a bandwidth hereinafter) of the spectrum of each transmittance peak is called a finesse F.

When such optical filter is used, certain incident light and another incident light having a wavelength difference that is an integer multiple of the wavelength interval $\Delta\lambda$FSR corresponding to the FSR cannot be distinguished from each other since they are simultaneously transmitted through the filter. In view of this problem, in the conventional wavelength multiplex communication system, wavelength multiplexing is performed within a single FSR of the optical filter so as to prevent radio interferences.

FIG. 15 is a graph showing the principle of this technique. In FIG. 15, the abscissa plots the wavelength, $\lambda$, and the ordinate plots the light intensity. $\lambda f1$ and $\lambda f2$ represent the wavelengths indicating the ends of the wavelength interval corresponding to a single FSR (the optical frequency=f1 to f2). $\lambda 1$ to $\lambda m$ represent the transmit wavelengths of terminal stations 1 to m, and the range from $\lambda$min to $\lambda$max represents the wavelength range for use in the system.

The light emission wavelengths of LDs sometimes vary by several nm due to a slight difference of the refractive indices of active layers and the pitches of diffraction gratings in the manufacture of the LDs. This variation range is equivalent to or larger than the width of the wavelength variable range of the LD. In order to adjust the light emission wavelengths of the LDs to fall within the FSR of the optical filter so as to attain a wavelength multiplex communication, the LDs must be selected in advance.

In order to cope with the individual differences of the light emission wavelengths of the LDs, the wavelength range for use in the system (i.e., the FSR of the FFP filter) may be broadened. However, it is generally difficult to largely change the finesse F value in the manufacture of LDs, and the broadened FSR leads to an increase in bandwidth, i.e., an increase in channel interval. On the other hand, the light emission wavelengths of the LDs must be set within their wavelength variable ranges so as not to cause any radio interferences with other stations. The increase in channel intervals lowers the degree of freedom in setting the light emission wavelength of the LD.

As described above, in order to realize a high-density wavelength multiplex communication in the conventional wavelength multiplex communication system, LDs used as light sources must be selected or adjusted in terms of wavelengths.

It is an object of the present invention to increase the yield by obviating the need for selection of LDs in terms of their wavelengths since a certain variation in the light emission wavelength of each light source is allowed.

SUMMARY OF THE INVENTION

In order to achieve the above object, the present invention provides the following optical communication method.

(1) An optical communication method for an optical communication system, which connects a plurality of optical nodes via an optical transmission path, and performs a communication by multiplexing a plurality of channels in the optical transmission path, comprises the steps of:

performing transmission by the transmitting optical node using a wavelength belonging to a wavelength group constituting a single channel, wherein each of the plurality of channels is constituted by a wavelength group consisting of a plurality of wavelengths separated from each other by a predetermined first wavelength interval; and performing reception by the receiving optical node by matching light detectivity peaks of optical detection means, which detects light in the optical transmission path and has a plurality of detectivity peaks separated by intervals corresponding to a natural number multiple of the predetermined first wavelength interval, with the wavelengths constituting the wavelength group of a required channel.

In this optical communication method, the available transmit wavelength ranges of transmission means of a plurality of optical nodes that perform transmission need not be adjusted. When an optical node that performs reception receives a first wavelength (i.e., a channel to which the first wavelength belongs) at the first timing and thereafter, receives, at the second timing, a second wavelength (i.e., a channel to which the second wavelength belongs) separated from the first wavelength by the detectivity peak interval or larger of the optical detection means, the node can receive the second wavelength using a detectivity peak different from the detectivity peak that was used for detecting the first wavelength. Therefore, the shift amount of the detectivity peak upon shifting from the first timing to the second timing does not exceed the detectivity peak interval.

(2) In the optical communication method of (1), since the wavelengths belong to different channels and nearest neighbor wavelengths are set to be separated from each other by at least a second wavelength interval that prevents interferences, so that the wavelengths do not cause interferences.

(3) In the optical communication method of (2), since a plurality of wavelengths are set to be separated by the second wavelength intervals to fall within the predetermined first wavelength interval, the plurality of wavelengths belonging to different channels, the available wavelength range can be used at a high density.

(4) In (1) to (3), since different channels are assigned to the plurality of optical nodes, each optical node can occupy one channel.

(5) In (1) to (3), the transmitting optical node comprises light detection means, which detects light in the optical transmission path and has a plurality of detectivity peaks separated by the predetermined first wavelength intervals, sweeps a wavelength within at least the predetermined first wavelength interval using the light detection means to detect a channel in use, and performs transmission using a wavelength belonging to a wavelength group constituting a channel that does not cause any interferences with the detected channel in use. With this arrangement, since a communication can be performed without assigning any channel to each optical node in advance, and only channels in use are present on the transmission path, the available channel region can be efficiently used.

(6) In (5), preferably, the transmitting optical node detects, using the light detection means, channels in use in the optical transmission path and a transmit channel of its own optical node, detects an interval between the transmit channel of its own optical node and the channel, closest to the transmit channel of its own optical node, of the detected channels in use on the basis of the detected channels, and maintains the detected interval to be a predetermined interval by controlling a transmit wavelength of its own optical node, since the channel interval can then be detected even when the wavelength varies due to a change in environment.

The present invention also provides an optical communication system which realizes the optical communication method.

DETAILED DESCRIPTION OF THE PREFERRED EMBODIMENTS (First Embodiment)

The first embodiment of the present invention will be described below with reference to the accompanying drawings.

The present specification will explain the principle and operation using wavelengths in place of optical frequencies. Note that the wavelength λ and the optical frequency ν can be converted to each other on the basis of the relation λ=c/(nν) (where c is the speed of light, and n is the refractive index of a medium, both of which are constants).

The FSR of an optical filter, which is the quantity that originally represents the "optical frequency interval" will be explained as the "wavelength interval" in the following embodiments.

Figure 3:
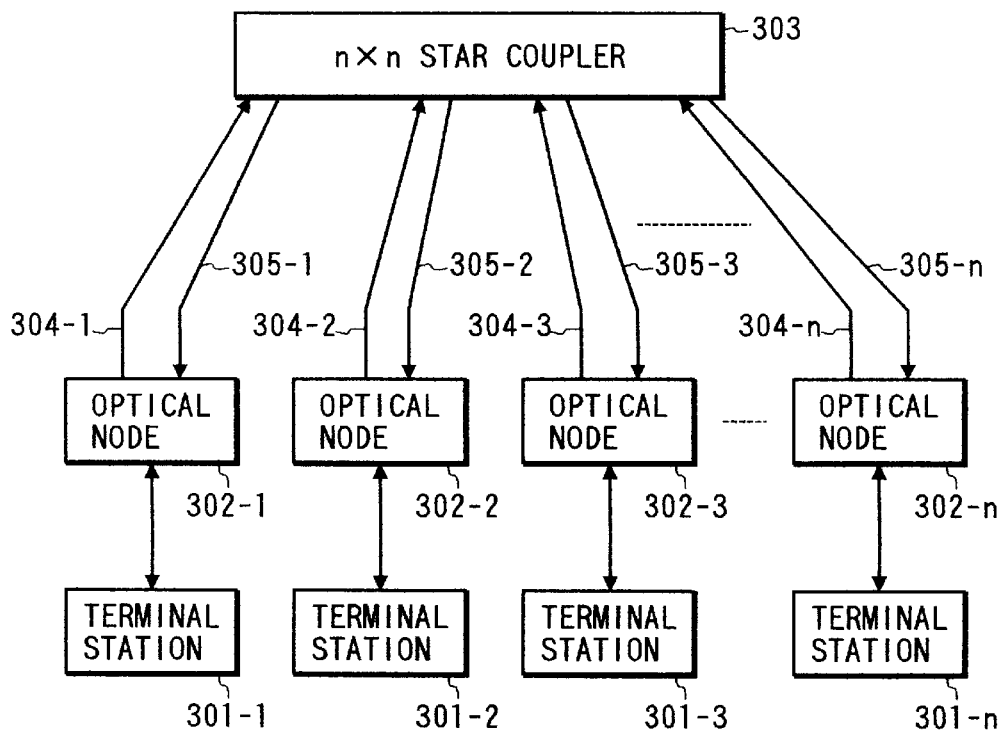
FIG. 3 is a block diagram showing the arrangement of an optical communication system, which adopts the wavelength control method according to the first embodiment of the present invention.

FIG. 3 is a block diagram showing the arrangement of an optical communication system of this embodiment. This optical communication system is a star network having n terminal stations, and is constituted by terminal stations 301-1 to 301-n, optical nodes 302-1 to 302-n, an n×n star coupler 303, and optical fibers 304-1 to 304-n and 305-1 to 305-n.

The terminal stations 301-1 to 301-n are connected to the n×n star coupler 303 via the optical nodes 302-1 to 302-n and the optical fibers 305-1 to 305-n. Transmit light from each optical transmitter is sent to the n×n star coupler 303 via a corresponding one of the transmit optical fibers 304-1 to 304-n. The n×n star coupler 303 evenly distributes the transmit light to the receive optical fibers 305-1 to 305-n and sends it to the optical nodes 302-1 to 302-n.

Figure 4:
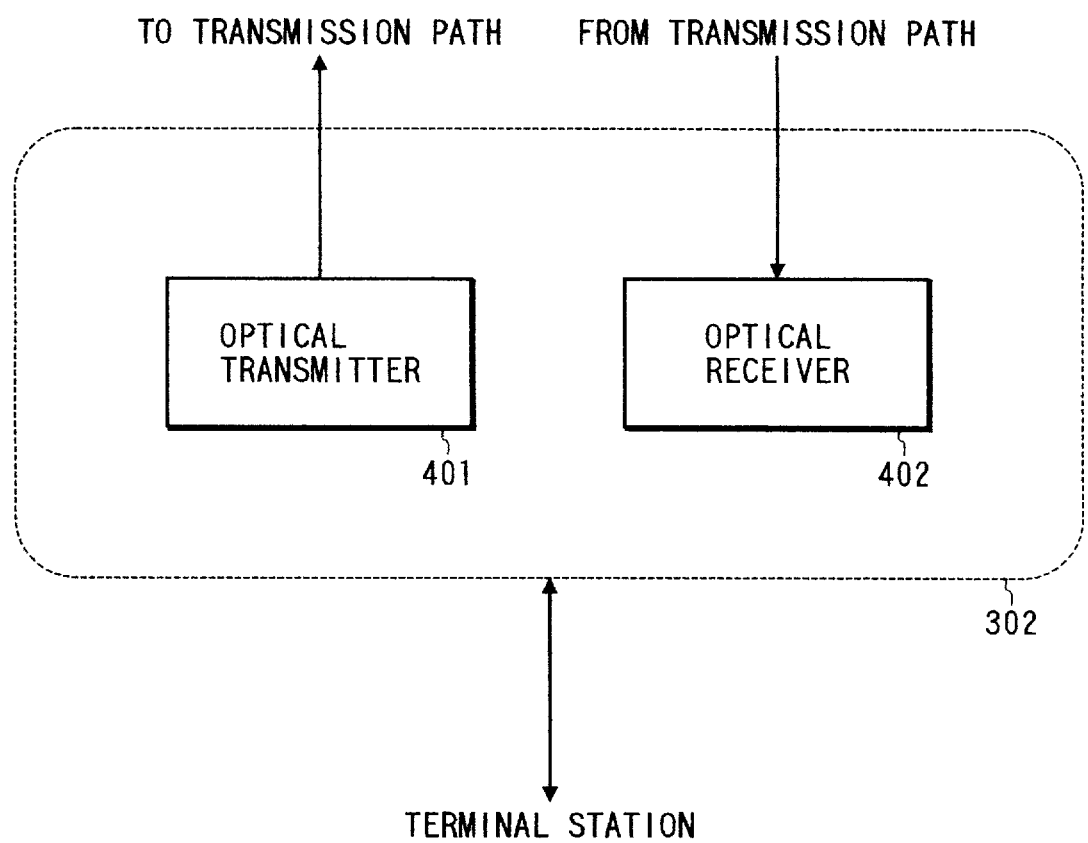
FIG. 4 is a block diagram showing the arrangement of an optical node in the first embodiment of the present invention.

FIG. 4 is a block diagram showing the arrangement. of the optical node 302. The optical node 302 is constituted by an optical transmitter 401 and an optical receiver 402.

Figure 5:
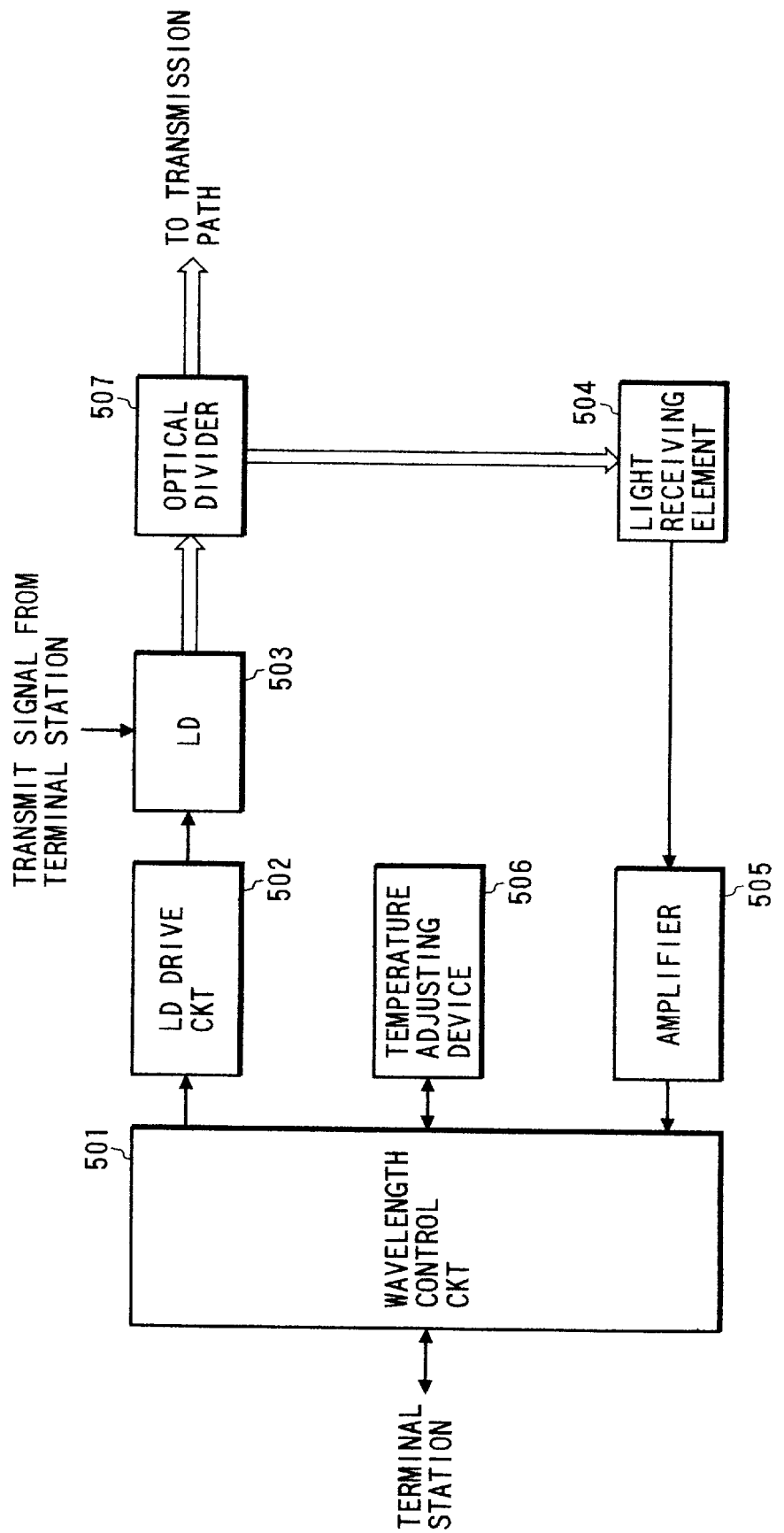
FIG. 5 is a block diagram showing the arrangement of an optical transmitter in the first embodiment of the present invention.

FIG. 5 is a block diagram showing the arrangement of the optical transmitter 401. The optical transmitter 401 is constituted by a control circuit 501, an LD drive circuit 502, an LD 503, a light receiving element 504, an amplifier 505, a temperature adjusting device 506, and an optical divider 507.

The control circuit 501 outputs a control signal to the LD drive circuit 502 on the basis of control signals from the terminal station and the amplifier 505. The LD drive circuit 502 outputs a drive current to the LD 503 on the basis of the input control signal. Also, the LD drive circuit 502 outputs a modulated current to the LD 503 on the basis of a transmit signal from the terminal station. The LD 503 outputs signal light to the optical divider 507. The optical divider 507 splits the signal light from the LD 503 into two optical signals, and outputs one signal to the transmission path and the other to the light receiving element 504.

Figure 6:
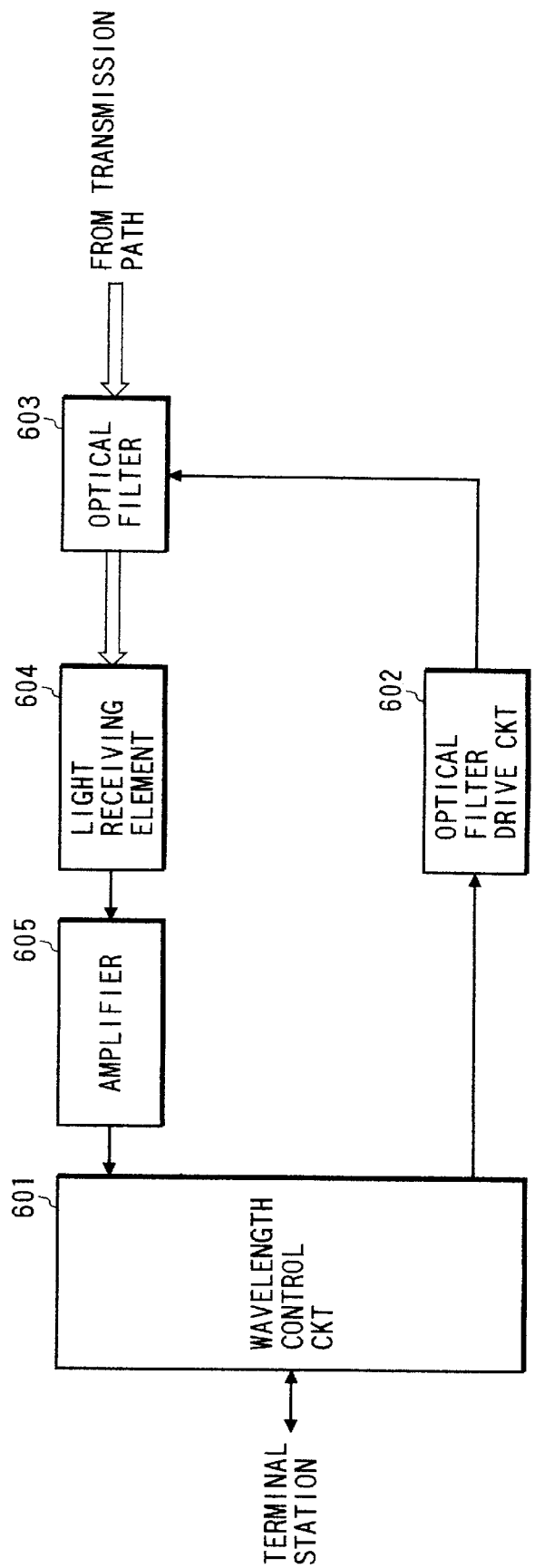
FIG. 6 is a block diagram showing the arrangement of an optical receiver in the first embodiment of the present invention.

FIG. 6 is a block diagram showing the arrangement of the optical receiver 402. The optical receiver 402 is constituted by a wavelength control circuit 601, a filter drive circuit 602, an optical filter 603, a light receiving element 604, and an amplifier 605.

An optical signal supplied from the transmission path is input to the optical filter 603. Light transmitted through the optical filter 604 is incident on the light receiving element 604, which converts the received light into an electrical signal. The electrical signal is amplified by the amplifier 605, and is then input to the wavelength control circuit 601. The wavelength control circuit 601 outputs a control signal to the filter drive circuit 602 on the basis of a control signal from the terminal station and the received signal from the amplifier 605, thereby controlling the transmission wavelength of the optical filter. Also, the circuit 601 outputs the received signal to the terminal station.

Assume that the amount $\Delta VF$ of change in control voltage VF to be supplied to the optical filter drive circuit 602 is proportional to the amount $\Delta\lambda F$ of change in transmission spectrum of the optical filter 603.

Figure 7:
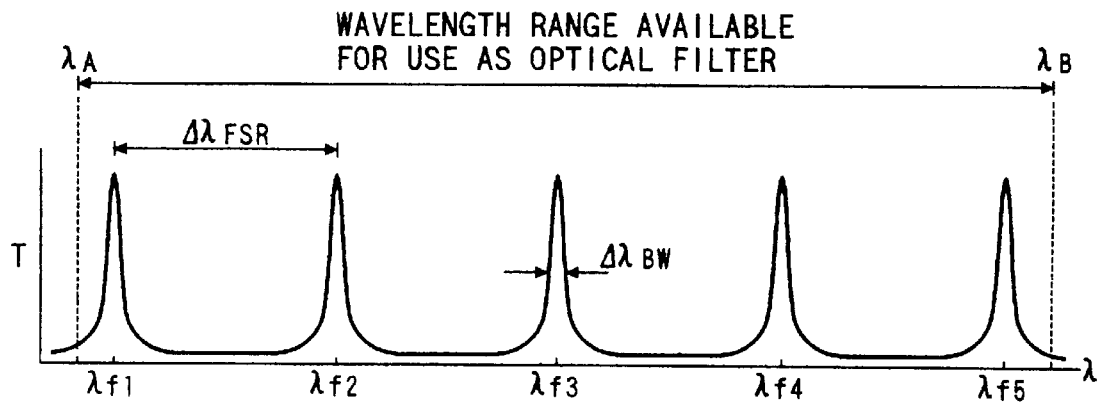
FIG. 7 is a graph showing the transmission spectrum of an optical filter in the first embodiment of the present invention.

FIG. 7 is a graph showing the transmission spectrum of the optical filter 603. In FIG. 7, the abscissa plots the wavelength $\lambda$, the ordinate plots the transmittance T, and $\lambda f1$ to $\lambda f5$ are the central wavelengths (to be referred to as filter transmission wavelengths hereinafter) of the mth- to (m+4) -th order transmittance peaks at a certain instance. As shown in FIG. 7, a plurality of transmission spectra are present at predetermined intervals, and their interval is $\Delta\lambda FSR$. On the other hand, $\Delta\lambda BW$ is the bandwidth of the transmission spectrum, and the range from $\lambda A$ to $\lambda B$ represents the available wavelength range for use in the optical filter.

The control circuit 501 monitors the output from the amplifier 505 to maintain a constant output light intensity of the LD 502. The temperature adjusting device 506 maintains the ambient temperature of the LD 502 to be a predetermined value. The transmit wavelength of the terminal station i is set to have a specific wavelength $\lambda i$. In this embodiment, only temperature control is performed. However, when the transmit wavelength must be stabilized with higher precision, some wavelength reference and a wavelength discrimination means are added, some light components of output light are split and compared with the reference value, and the obtained error is fed back to the LD drive current.

The optical filter 603 has a plurality of transmittance peaks, as shown in FIG. 7. The wavelength difference between adjacent peaks is $\Delta\lambda FSR$.

The characteristic feature of this embodiment will be described below.

In this embodiment, a set of wavelengths having equal wavelength intervals are assigned to one channel. Also, in this embodiment, channels are individually assigned to the respective terminal stations. When transmission is performed, each terminal station selects and uses, as a transmit wavelength, one of the wavelengths constituting the assigned channel. The wavelength to be used of those constituting the assigned channel can be determined by the optical node that performs transmission.

Reception of signals transmitted using the above-mentioned channels can be realized by using, as a filter of the receiver for selecting a channel to be received (i.e., a channel including the wavelength to be received), a filter A), which has a plurality of transmittance peaks, B) in which the wavelength intervals between adjacent peaks are equal to each other, and are equal to the wavelength interval of the wavelengths constituting each channel, and C) which can continuously sweep the wavelength while maintaining the wavelength interval. As such filter, the FFP filter is known. The FFP filter has a plurality of transmittance peaks at the period FSR, and the wavelength interval FSR has almost no change before and after the sweep operation.

Figure 1:
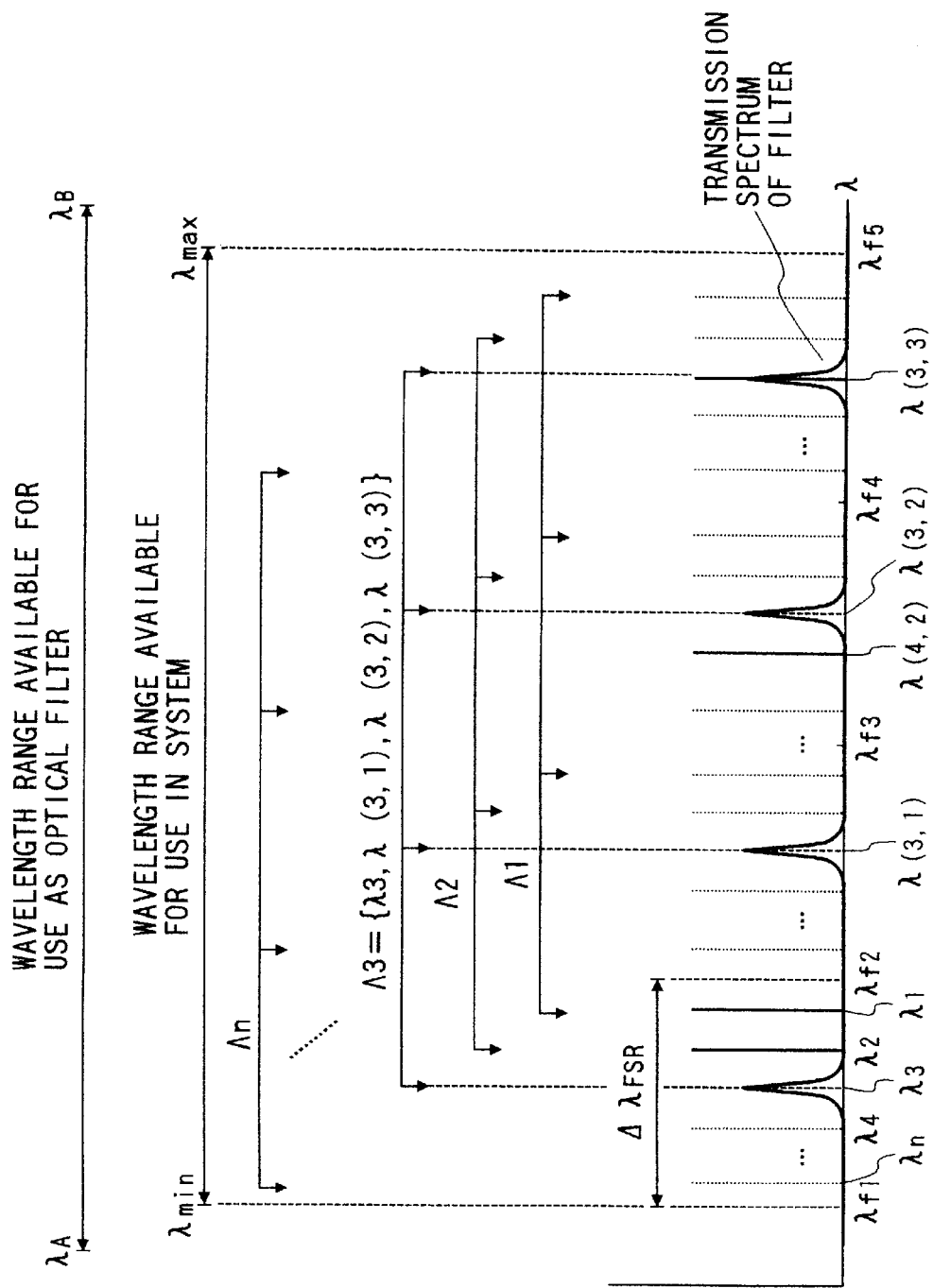
FIG. 1 is a graph for explaining the wavelength use method according to the first embodiment of the present invention.

In this embodiment, since reception is performed by simultaneously using a plurality of transmittance peaks, the transmit wavelength range can be set over the wavelength range equal to or larger than $\Delta\lambda FSR$, as shown in FIG. 1.

FIG. 1 shows the wavelength use method of this embodiment. The abscissa plots the wavelength $\lambda$, and the ordinate plots the light intensity. The range from $\lambda$min to $\lambda$max represents the wavelength range for use in the system, and the range from $\lambda A$ to $\lambda B$ is the available wavelength range for use in the optical filter. $\lambda f1$ to $\lambda f5$ are the central wavelengths (to be referred to as filter transmission wavelengths hereinafter) of the mth- to (m+4)-th order transmittance peaks at a certain reference instance. Also, FIG. 1 also shows the transmission spectrum of the optical filter at another instance (when the transmission wavelength of the optical filter is adjusted to the channel to which a wavelength $\lambda 3$ belongs).

In FIG. 1, solid lines represent optical signals on the transmission path, and dotted lines represent the wavelengths, which are not used in the respective channels. In FIG. 1, $\lambda 1, \lambda 2$, $\lambda(3,3)$, and $\lambda(4,2)$ are the wavelengths, which are actually used. $\Lambda 1$ to $\Lambda 4$ are equivalent wavelength sets (to be described later) to which $\lambda 1$ to $\lambda 4$ belong.

The above-mentioned characteristic feature will be described in more detail below.

In the present invention, when the wavelength difference between two arbitrary wavelengths is an integer multiple of $\Delta\lambda FSR$ of the optical filter, these two wavelengths are equivalent to each other. A wavelength $\lambda(i,m)$ equivalent to a wavelength $\lambda i$ is given by:

$$\lambda(i,m)=\lambda i+m\Delta\lambda FSR (m: \text{integer})$$

for $\lambda(i,0)=\lambda i$. The transmission peak wavelengths of the FFP filter are equivalent to each other. A detector cannot distinguish signals having equivalent wavelengths from each other since they appear the same for the detector.

A set of wavelengths, included in the wavelength range $\lambda$min to $\lambda$max for use in the system, of those equivalent to $\lambda i$ is called an equivalent wavelength set of $\lambda i$. That is, $$\Lambda i \epsilon \{\lambda(i,m) | \lambda \min \leq \lambda(i,m) \leq \lambda \max, \ m: \text{integer}\}$$

In other words, a set of wavelengths that can be simultaneously received using the FFP filter is an equivalent wavelength set. For example, an equivalent wavelength set of $\lambda 3$ is $\Lambda 3 = \{\lambda 3, \lambda(3,1), \lambda(3,2), \lambda(3,3)\}$ in FIG. 1.

In this embodiment, one transmission wavelength set described above is used as one channel. The transmit wavelengths of each optical node are defined as follows:

1) In order to prevent radio interferences between wavelengths belonging to different channels, temporary channel wavelengths $\lambda i$ are determined using as $\Delta\lambda$ the wavelength interval that does not cause any radio interferences. That is, $$\lambda 1, \ \lambda 2 = \lambda 1 - \Delta\lambda, \ \lambda 3 = \lambda 1 - 2\Delta\lambda, \ldots$$

At this time, the temporary channel wavelengths are set to fall within one $\Delta\lambda$FSR at the reference instance. In this case, the sum of the wavelength interval between $\lambda 1$ and the end at the longer wavelength side of the one $\Delta\lambda$FSR, and the wavelength interval between the shortest one of the temporarily channel wavelengths and the end at the shorter wavelength side of the one $\Delta\lambda$FSR is set to be equal to or larger than $\Delta\lambda$.

2) One equivalent wavelength set $\Lambda i$ of $\lambda i$ is assigned to each optical node as a channel.

3) The optical node, which is assigned the equivalent wavelength set $\Lambda i$ uses an arbitrary element $\lambda(i,k)$ as a transmit wavelength of its own optical node.

FIG. 1 illustrates a state wherein four signals are output onto the transmission path. The optical node, which is assigned the equivalent wavelength set $\Lambda 1$ as a channel uses the wavelength $\lambda 1$ as its transmit wavelength, the optical node, which is assigned $\Lambda 2$ uses the wavelength $\lambda 2$ as its transmit wavelength, the optical node, which is assigned $\Lambda 3$ uses the wavelength $\lambda(3,3)$ as its transmit wavelength, and the optical node, which is assigned $\Lambda 4$ uses the wavelength $\lambda(4,2)$ as its transmit wavelength.

Figure 2:
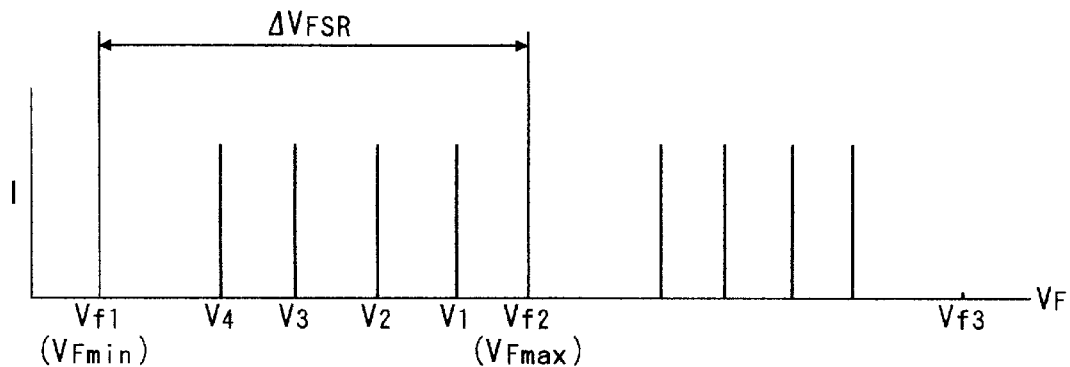
FIG. 2 is a graph for explaining the relationship between the filter control voltage and the amplifier output in the first embodiment of the present invention.

The relationship between the control voltage, VF, for the receive filter, and the amplifier output, I, in the receiver is as shown in FIG. 2. FIG. 2 is a graph for explaining the relationship between the filter control voltage and the amplifier output in this embodiment. The abscissa plots the filter control voltage VF, and the ordinate plots the amplifier output I. Vf1 to VF3 indicate the filter control voltages when the mth-order filter transmission wavelength matches $\lambda$f1 to $\lambda$f3. V1 to V4 indicate the filter control voltages when the mth-order filter transmission wavelength matches $\lambda$f1 to $\lambda$f4. $\Delta$VFSR indicates the potential difference corresponding to the FSR.

In this receiver, if the mth-order filter transmission wavelength of the optical filter matches $\lambda 1$ at V1, the mth-order filter transmission wavelength matches $\lambda 2$ at V2, the (m+3)th-order filter transmission wavelength matches $\lambda(3,3)$ at V3, and the (m+2)th-order filter transmission wavelength matches $\lambda(4,2)$ at V4. As shown in FIG. 2, identical signals repetitively appear along the VF axis at a period $\Delta$VFSR. Therefore, the sweep range of the filter control voltage VF required for receiving all the signals can be the range from VFmin to VFmax (=VFmin+$\Delta$VFSR). That is, in the present invention, one of a plurality of transmission peaks matches a desired wavelength upon sweeping the filter across one $\Delta\lambda$FSR. For this reason, all the channels can be detected by sweeping the filter across one $\Delta\lambda$FSR. In the other words, when one wavelength matches one of a plurality of transmission peaks, this state is recognized as a state wherein the one wavelength matches one of the plurality of transmission peaks without specifying the matched transmission peak, i.e., a state wherein a channel to which the one wavelength belongs is detected.

The communication procedure of each terminal station in this embodiment will be described below.

Operation (1) A station in an idle state (a state wherein it is performing neither transmission nor reception) attempts to perform reception by sweeping the control voltage VF of the filter drive circuit across the range from VFmin to VFmax.

Operation (2) Upon detection of a signal, the station checks if the signal includes an identification signal addressed to its own station.

Operation (3) When the signal includes an identification signal addressed to its own station, the control voltage VF of the filter drive circuit is locked.

Operation (4) When the signal does not include any identification signal addressed to its own station, the station continues the sweep operation.

Operation (5) When the station cannot detect any signal, it stops the sweep operation of the control voltage at VFmax, resets the control voltage to VFmin, and then, restarts sweeping toward VFmax.

As described above, according to this embodiment, the entire available wavelength range for use in the filter can be used as the available transmit wavelength range under the same reception control as in the conventional system. As a result, even when the wavelengths of the LDs vary over a broad range due to their individual differences, they can be used as light sources.

(Second Embodiment)

In the first embodiment, channels each constituted by transmission wavelengths are set in advance, and are assigned to the respective optical nodes. However, in this embodiment, an optical node of a terminal station that has a transmit request detects channels in use, starts transmission at a wavelength that may not cause any radio interferences with the detected channels, and occupies a channel consisting of wavelengths equivalent to the transmit wavelength until the transmission is completed.

The second embodiment of the present invention will be described below with reference to the accompanying drawings.

Figure 8:
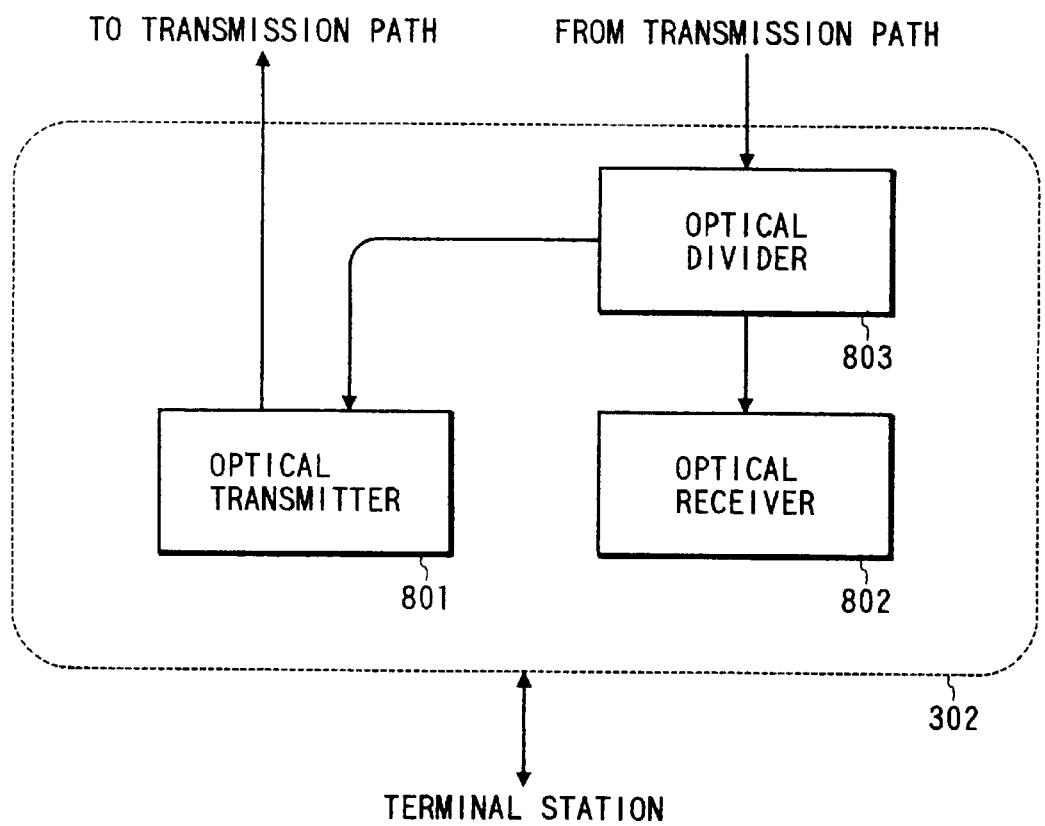
FIG. 8 is a block diagram showing the arrangement of an optical node in the second embodiment of the present invention.

FIG. 8 is a block diagram showing the arrangement of the optical node 302 of this embodiment. The optical node 302 is constituted by an optical transmitter 801, an optical receiver 802, and an optical divider 803. The optical transmitter 801 outputs transmit light onto the transmission path. The optical divider 803 divides signal light from the transmission path into two signals, and outputs one signal to the optical receiver 802 and the other to the optical transmitter 801.

Figure 9:
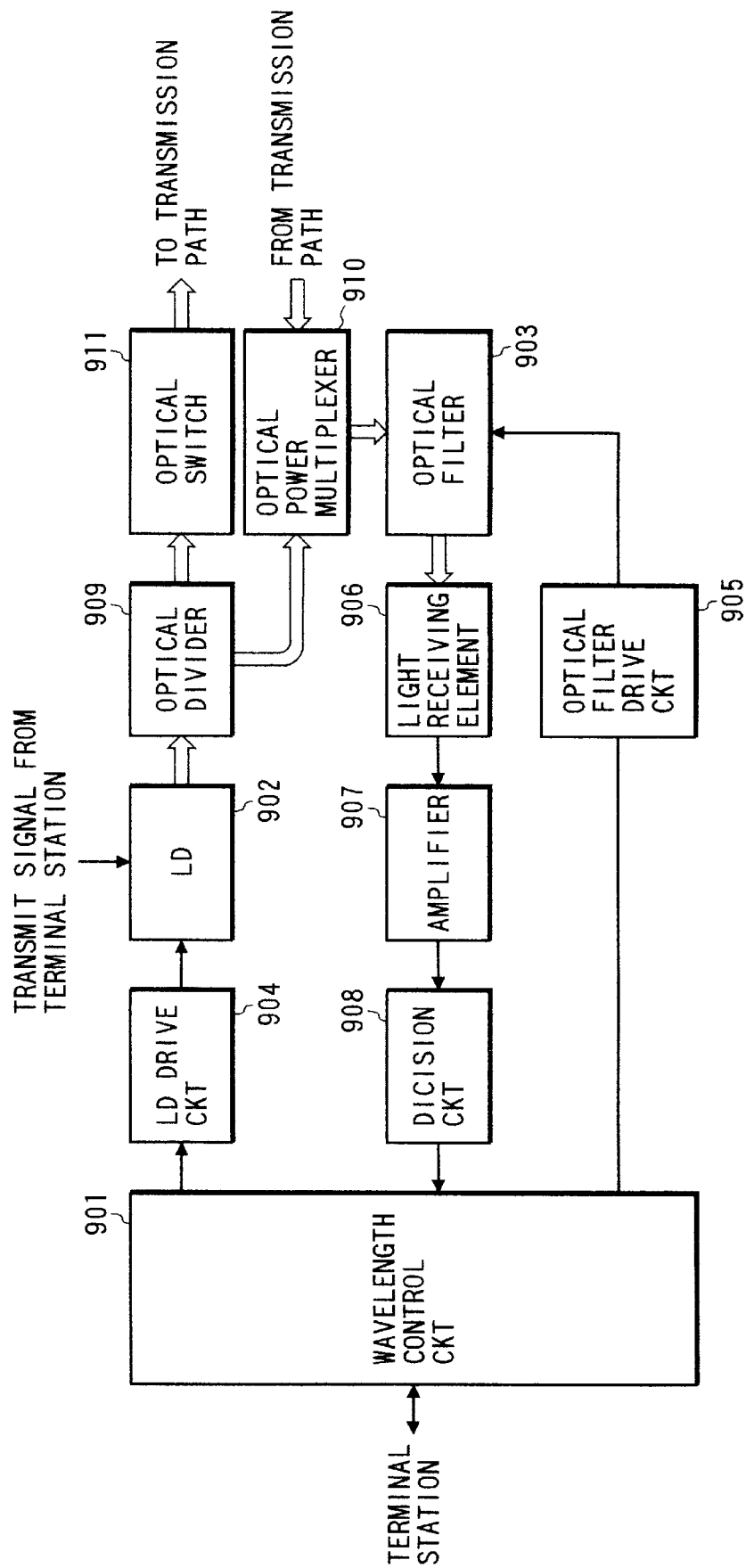
FIG. 9 is a block diagram showing the arrangement of an optical transmitter in the second embodiment of the present invention.

FIG. 9 is a block diagram showing the arrangement of the optical transmitter of this embodiment. The optical transmitter is constituted by a wavelength control circuit 901, an LD 902, an optical filter 903, an LD drive circuit 904, an optical filter drive circuit 905, a light receiving element 906, an amplifier 907, a decision circuit 908, an optical divider 909, an optical power multiplexer 910, and an optical switch 911.

The wavelength control circuit 901 is constituted by an arithmetic processing circuit, a memory element, an A/D converter, a D/A converter, and the like. The control circuit 901 controls the LD drive circuit 904 and the optical filter drive circuit 905 on the basis of a control signal from the terminal station and the output signal from the decision circuit 908 to perform a tuning operation. Also, the circuit 901 stores parameters and operation procedures required for operations.

Assume that the amount ΔVFD of change in control voltage, VFD, to be supplied to the LD drive circuit 904 is proportional to the amount ΔλF of change in transmit wavelength λL of the LD 902. Similarly, assume that the amount λVF of change in control voltage VF to be supplied to the optical filter drive circuit 905 is proportional to the amount ΔλF of change in transmission spectrum of the optical filter 903. Furthermore, assume that the wavelength control circuit 901 can calculate an LD control voltage ΔVLD corresponding to a given wavelength difference Δλ on the basis of the filter control voltage difference ΔVF corresponding to Δ80. That is, the circuit 901 can calculate ΔVLD=f(ΔVF).

Optical signals from the transmission path and the optical divider are multiplexed by the optical power multiplexer 910, and the multiplexed signal is input to the optical filter 903. Light transmitted through the optical filter 903 is converted into an electrical signal via the light receiving element 904 and the amplifier 905. The decision circuit 908 outputs an H- or L-level digital signal depending on the intensity of an input signal. The threshold value of the decision circuit 908 is set in advance to be a voltage when the filter reliably detects an optical signal.

The optical divider 909 divides the output from the LD 902 into two signals, and outputs one signal to the optical switch 911 and the other to the optical power multiplexer 910. The optical switch 911 turns on/off an optical circuit on the basis of a control signal from the wavelength control circuit 901 to switch the output/non-output state of the LD output onto the transmission path. The optical power multiplexer 910 multiplexes the optical signal from the transmission path and the LD output from the optical divider 909, and outputs the transmit signal of its own station and other stations to the optical filter 903.

Figure 10:
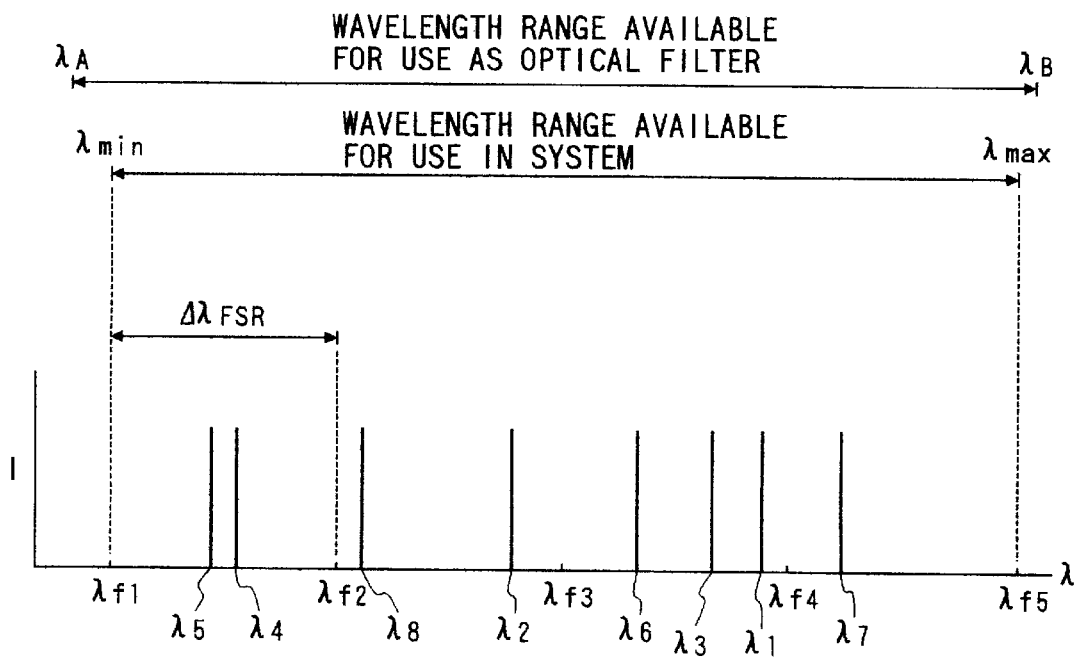
FIG. 10 is a graph showing the wavelength use method in the second embodiment of the present invention.

FIG. 10 shows the wavelength use method of this embodiment. In FIG. 10, the abscissa plots the wavelength λ, and the ordinate plots the signal intensity I. In this embodiment, communications are performed using wavelengths λ1 to λ8 which are dispersed over the wavelength range for four FSRs. To prevent radio interferences, the wavelengths λ1 to λ8 are set so that their equivalent wavelengths do not become smaller than the channel interval Δλ.

Figure 11:
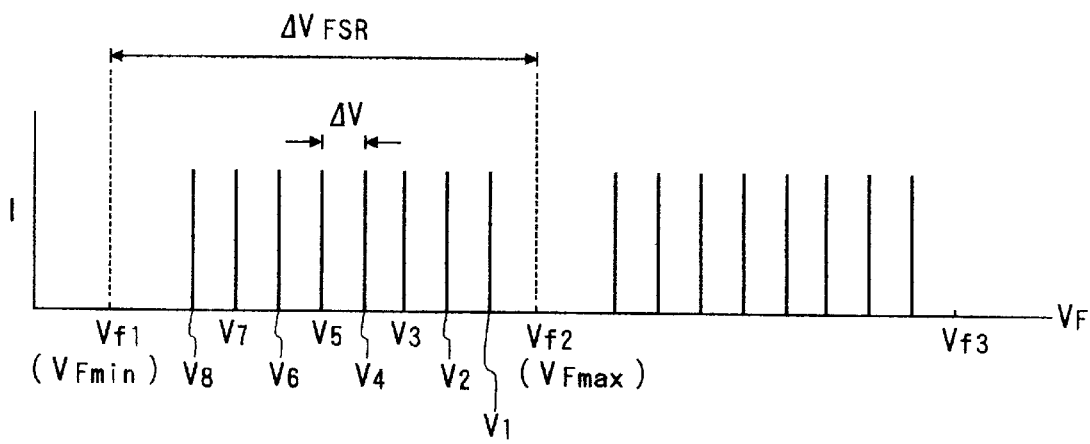
FIG. 11 is a graph for explaining the relationship between the filter control voltage, VF, and the amplifier output intensity, I, in the second embodiment of the present invention.

FIG. 11 is a graph for explaining the relationship between the filter control voltage VF and the amplifier output intensity I in this embodiment. Vf1 to Vf3 indicate the filter control voltages when the mth-order filter transmission wavelength matches λf1 to λf3. Similarly, V1 to V8 indicate the filter control voltages when the mth-order filter transmission wavelength matches λ1 to λ8. Furthermore, ΔVFSR indicates the filter control voltage corresponding to the FSR, and ΔV indicates the control voltage corresponding to the channel interval Δλ.

Figure 12A:
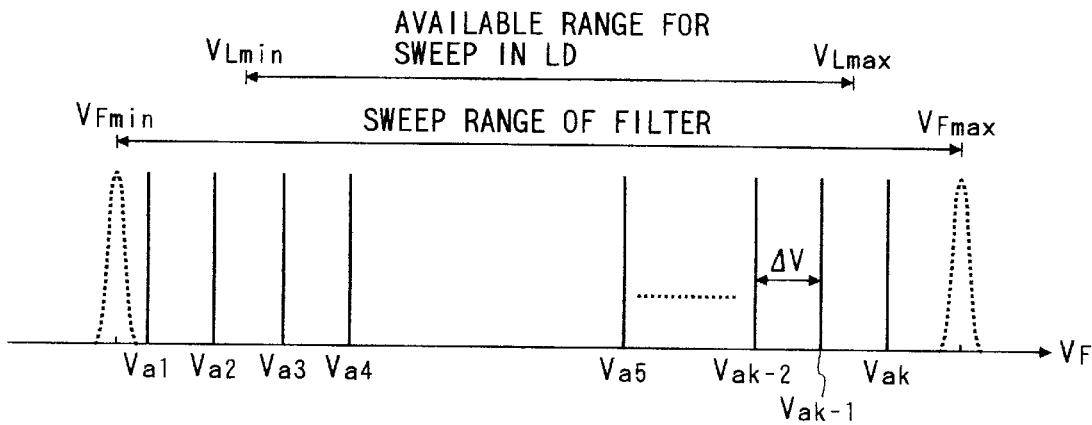
FIGS. 12A to 12C are graphs for explaining the transmission preparation operation in the communication procedure of each terminal station in the second embodiment of the present invention.
Figure 12B:
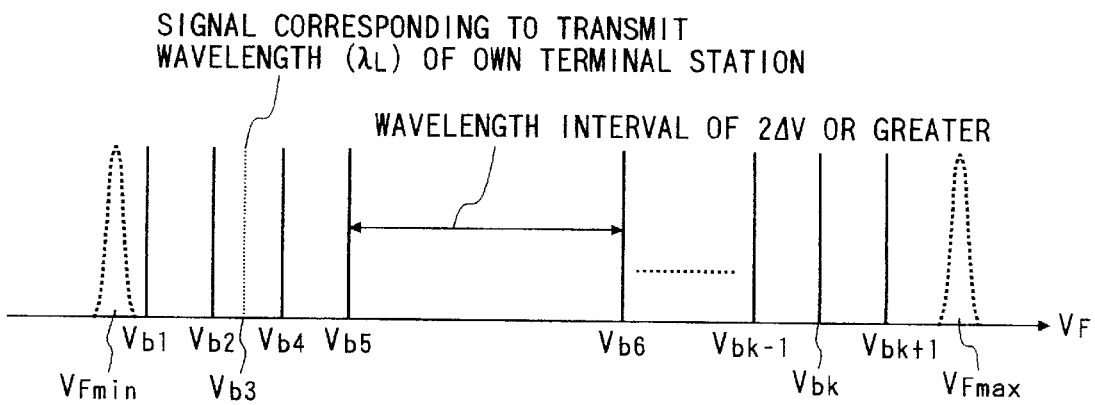
Figure 12C:
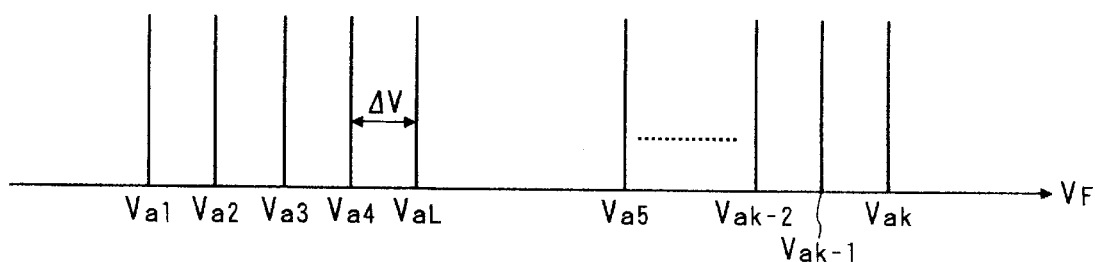

FIGS. 12A to 12C are graphs for explaining the transmission preparation operation of the communication procedure of each terminal station in this embodiment. In each of FIGS. 12A to 12C, the abscissa plots the filter control voltage VF, and the ordinate plots the output from the decision circuit.

FIG. 12A is a graph for explaining operation 1-1, and shows a state immediately before transmission is started. Va1 to Vak indicate the values of the filter control voltage VF upon detection of transmit signals on the transmission path during this operation. The range from VLmin to VLmax represents the range of the filter control voltage VF corresponding to the sweep wavelength range (λLmin to λLmax) of the LD of a given optical node, and the range from VFmin to VFmax represents the range of the filter control voltage corresponding to the sweep range (λFmin to λFmax) of the filter.

FIG. 12A shows the available sweep range of the LD as the range (VLmin to VLmax) of the filter control voltage VF. This range corresponds to the range from λLmin to λLmax on the wavelength axis. Similarly, FIG. 12A shows the filter sweep range as the range from VFmin to VFmax. This range corresponds to the range from λFmin to λFmax for the mth-order transmission peak wavelength. In this case, if the FSR of the filter is ΔλFSR, λFmax=λFmin+ΔλFSR. In addition, ΔV indicates the potential difference of the control voltage corresponding to Δλ.

FIG. 12B is a graph for explaining operation 1-2, and shows a state wherein transmission has been started at the wavelength λLmin but no optical signal has been output onto the transmission path yet. Vb1 to Vbk+1 indicate the values of the filter control voltage VF upon detection of transmit signals on the transmission path during this operation.

FIG. 12C is a graph for explaining operation 1-3, and shows a state wherein an optical signal has begun to be output onto the transmission path at a wavelength λL'.

Figure 13:
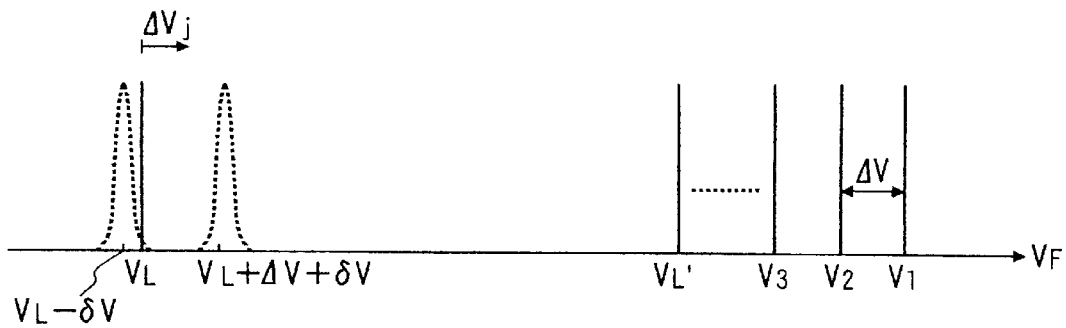
FIG. 13 is a graph for explaining the wavelength shift operation in the communication procedure of each terminal station in the second embodiment of the present invention.

FIG. 13 is a graph for explaining the wavelength shift operation of the communication procedure of each terminal station in this embodiment. The abscissa plots the filter control voltage VF, and the ordinate plots the output from the decision circuit. VL is the filter control voltage corresponding to the transmit wavelength λL of its own terminal station. Dotted curves indicate the transmission spectra of the filter. ΔV is the potential difference of the control voltage corresponding to Δλ. δV indicates a predetermined potential difference, i.e., a margin for allowing an error or the like for the minimum required sweep potential difference, and for reliably detecting the transmit wavelengths of its own terminal station and other terminal stations. ΔVj also indicates a predetermined potential, i.e., the shift amount of the sweep start voltage for shifting the sweep range.

Figure 14:
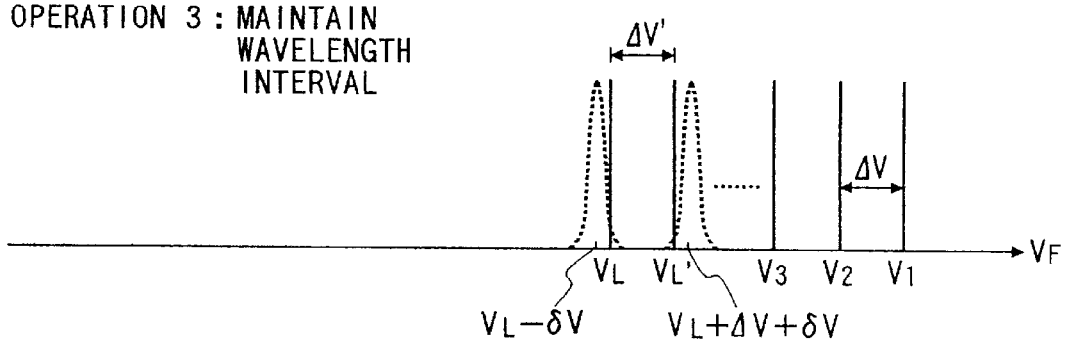
FIG. 14 is a graph for explaining the wavelength shift operation in the communication procedure of each terminal station in the second embodiment of the present invention.
Figure 15:
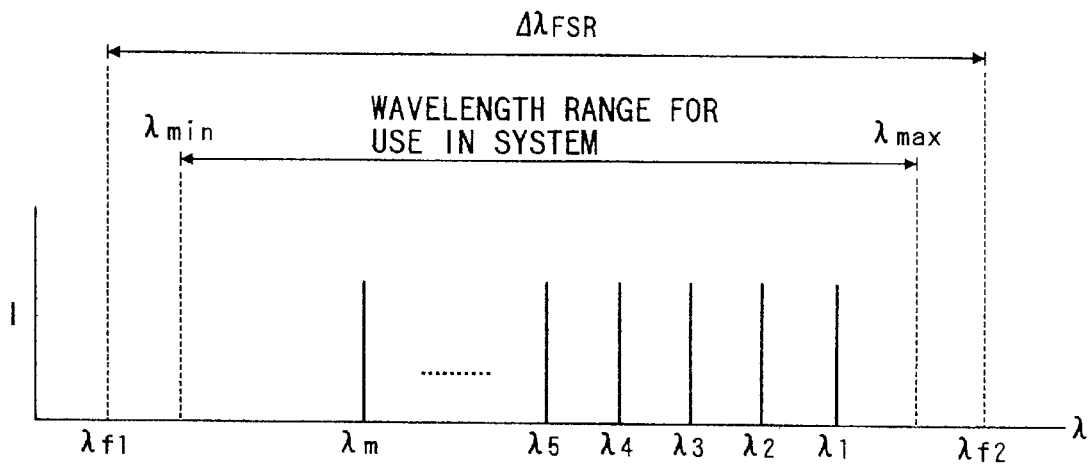
FIG. 15 is a graph showing the conventional wavelength use method.

FIG. 14 is a graph for explaining the wavelength interval maintaining operation of the communication procedure of each terminal station in this embodiment. The abscissa plots the filter control voltage VF, and the ordinate plots the output from the decision circuit. VL and VL' respectively indicate the voltage control voltages corresponding to λL and λL'. ΔV is the potential difference of the control voltage corresponding to Δλ, and ΔV' is the potential difference between VL and VL'.

FIG. 3 is a block diagram showing the arrangement of an optical communication system to which the wavelength control method of this embodiment is applied.

FIG. 6 is a block diagram showing the arrangement of the optical receiver of this embodiment.

FIG. 7 is a graph showing the transmission spectra of the optical filters 603 and 903 of this embodiment.

Since FIGS. 3, 6, and 7 have already been described in the first embodiment, a detailed description thereof will be omitted.

The characteristic feature of this embodiment will be described below.

In this embodiment, both the transmit wavelength of an optical node that performs transmission and the receive wavelength of an optical node that performs reception are variable.

As the receiver, the same receiver as in the first embodiment is used. The transmitter comprises a wavelength variable light source and a wavelength variable optical filter. The wavelength variable filter is an FFP filter having the same FSR as that of the filter used in the receiver.

The transmitter transmits the wavelengths of optical signals on the transmission path using the FFP filter, and recognizes the use state of the transmission path as the positional relationship along the filter control voltage VF axis. That is, the transmitter detects the use state of the channels without determining the order of the transmission peak of the transmitted optical signal. Also, the interval (i.e., the potential difference) between the channel used by its own node and the neighboring channel on the VF axis is kept constant to prevent radio interferences and to improve the utilization efficiency of the available wavelengths.

FIG. 10 shows a use example of wavelengths in this embodiment. In this embodiment, communications are performed using the wavelengths $\lambda 1$ to $\lambda 8$.

FIG. 11 shows the relationship between the filter control voltage VF and the amplifier output I of the transmitter when the wavelengths on the transmission path are in the state shown in FIG. 10 and the optical filters having the transmission spectra shown in FIG. 7 are used. In FIG. 11, V1 to V8 respectively correspond to the wavelengths $\lambda 1$ to $\lambda 8$.

The transmitter always controls the transmit wavelength $\lambda L$ of its own terminal station to maintain a constant interval from another terminal station on the VF axis, thereby preventing radio interferences. For example, assume that its own terminal station is performing transmission using the wavelength $\lambda 5$. On the VF axis, V5 corresponds to $\lambda 5$. The transmitter controls the transmit wavelength $\lambda 5$ of its own terminal station so that the potential difference V4—V5 between the signal V4 of the neighboring terminal station and the signal V5 of its own terminal station on the VF axis always matches $\Delta V$.

The communication procedure of each terminal station in this embodiment will be described below. Since the reception operation is the same as that in the first embodiment, a detailed description thereof will be omitted. The transmission operation will be explained below.

Operation 1-1: Preparation for Transmission 1

FIG. 12A is a graph for explaining operation 1-1. In operation 1-1, channels used by other nodes on the transmission path are detected prior to transmission. The wavelength control circuit sets the optical switch in the OFF state, and sweeps the filter control voltage within the range from VFmin to VFmax. Simultaneously with the sweep operation, the wavelength control circuit monitors the output from the decision circuit, and stores the filter control voltages Va1 to Vak (k: the number of terminal stations, which are performing transmission) corresponding to optical signals on the transmission path.

Operation 1-2: Preparation for Transmission 2

FIG. 12B is a graph for explaining operation 1–2. In operation 1-2, the relative positional relationship between the transmit wavelength (i.e., a channel to which the wavelength belongs) of its own node and channels, which are being used by other nodes is recognized. The wavelength control circuit controls the LD to oscillate at a transmit wavelength $\lambda L=\lambda Lmin$ while the optical switch is kept in the OFF state. Subsequently, the wavelength control circuit sweeps the filter control voltage VF within the range from VFmin to VFmax. At the same time, the wavelength control circuit monitors the output from the decision circuit, and stores the filter control voltages Vb1 to Vbk+1 corresponding to optical signals on the transmission path and the transmit signal of its own node.

The voltages Va1 to Vak obtained in operation 1-1 and the voltages Vb1 to Vbk+1 obtained in operation 1-2 are compared to obtain the filter control voltage VL corresponding to the transmit wavelength $\lambda Lmin$ of its own terminal station. In FIG. 12B, VL=Vb3. Then, paying attention to a potential difference $\Delta Va1$ (=Va1+1−Va1) for the voltages Va1 to Vak and VFmax, a potential difference $\Delta Vam$ (=Vam+1−Vam) A), which is equal to or larger than $2\Delta V$, and B) which corresponds to the shortest wavelength side is detected. If no potential difference equal to or larger than $2\lambda V$ can be detected, it means that a transmit channel cannot be assigned, and the transmission is interrupted. Then, the control returns to operation 1-1 and repeats operations 1-1 and 1-2 so as to wait for a state wherein a potential difference equal to or larger than $2\Delta V$ is generated, i.e., a transmit channel can be assigned.

Operation 1-3: Start of Transmission

FIG. 12C is a graph for explaining operation 1-3. In operation 1–3, the transmit wavelength of its own terminal station is determined, and the transmission is started. The wavelength control circuit sets the filter control voltage VF to be VF=Vam+$\lambda V$ on the basis of Vam detected in operation 1-2. Then, the wavelength control circuit sweeps the control voltage to be supplied to the LD drive circuit, and fixes it when the output from the decision circuit changes to H. With this operation, since the light emission wavelength of the LD matches the transmission wavelength of the filter, which is set to be a wavelength that causes any radio interferences with other channels, the wavelength control circuit then sets the optical switch in the ON state to start transmission. Thereafter, the channel consisting of the light emission wavelength of this LD and its equivalent wavelengths is being used by this optical node. As will be described below, since the light emission wavelength of the LD is changed, equivalent wavelengths constituting this channel change accordingly.

Operation 2: Wavelength Shift

FIG. 13 is a graph for explaining operation 2. In operation 2, the transmit wavelength $\lambda L$ is changed toward the longer wavelength side while performing transmission. The wavelength control circuit sets the voltage control voltage VF to be VF=VL−$\delta V$ on the basis of the filter control voltage VL corresponding to $\lambda L$. Subsequently, the wavelength control circuit sweeps VF up to VL+$\Delta V$+$\delta V$. At this time, the wavelength control circuit stores VF upon detection of the transmit wavelength $\lambda L$ of its own terminal station as VL'. Note that $\delta V$ is a predetermined potential difference that satisfies $\Delta V>>\delta V>0$, i.e., a margin for reliably detecting the transmit wavelengths of its own terminal station and other terminal stations.

When the transmit wavelength $\lambda L'$ of another terminal station is detected during the sweep operation, this means that a channel, which is being used by its own node and a neighboring channel are present within the sweep range of this operation, i.e., the range corresponding to the sum of $\Delta V$ and $2\delta V$. Thus, the control transits to operation 3. If the transmit wavelength $\lambda L'$ cannot be detected, this means that the channel which is being used by its own node is sufficiently separated from a neighboring channel. Thus, in order to set this interval to be closer to a predetermined interval, the wavelength control circuit shifts the transmit wavelength $\lambda L$ of its own terminal station by a predetermined value $\Delta\lambda j$ toward the neighboring channel side. More specifically, the control circuit adds an LD control voltage $\Delta VLDj$ corresponding to $\Delta\lambda j$ to the LD control voltage used so far. The wavelength control circuit also shifts the sweep start voltage of the filter control voltage by $\Delta Vj$ as the filter control voltage corresponding to $\Delta\lambda j$ (i.e., sets VF=VL−$\delta V$+$\Delta Vj$), and the control repeats operation 2. Every time this operation is repeated, the sweep range and the light emission wavelength of the LD of its own node shift toward the neighboring channel side (the longer wavelength side in this case). Note that $\Delta\lambda j$ is the predetermined wavelength that satisfies $\Delta\lambda > \Delta\lambda j > 0$. Therefore, $\Delta Vj$ is the predetermined potential difference that satisfies $\Delta V > \Delta Vj > 0$. The value $\Delta\lambda j$ is set to satisfy $\Delta\lambda - \Delta\lambda j \geq \Delta\lambda ct$ (where $\Delta\lambda ct$ is the minimum wavelength interval required by the system to assure crosstalk prevention) so that the filter can follow any change in wavelength, and radio interferences can be prevented.

When the transmit wavelength $\lambda L$ of its own terminal station has reached the longest wavelength $\lambda Lmax$, the wavelength control circuit stops the shift operation of the transmit wavelength, and continues transmission while $\lambda L = \lambda Lmax$.

Operation 3: Maintain Wavelength Interval

FIG. 14 is a graph for explaining operation 3. The abscissa plots VF, and the ordinate plots the output from the decision circuit. Let VL and VL' be the filter control voltages VF corresponding to $\lambda L$ and $\lambda L'$. Also, let VLD be the LD control voltage corresponding to $\lambda L$, and s be the terminal station which is transmitting $\lambda L'$. In operation 3, the potential difference $\Delta V'(=VL'-VL)$ from the neighboring terminal station on the VF axis is always controlled to match $\Delta V$ while performing transmission.

The wavelength control circuit sets the filter control voltage VF to be $VF=VL-\delta V$. Subsequently, the wavelength control circuit sweeps VF up to $VF=VL+\Delta V+67$ V to detect $\lambda L$ and $\lambda L'$, thus obtaining VL and VL'. Also, the wavelength control circuit calculates the difference, $\Delta Verr$ $(=\Delta V-\Delta V')$, between the potential differences $\Delta V'$ and $\Delta V$. Furthermore, the wavelength control circuit calculates an LD control voltage $\Delta VLD\_err$ corresponding to $\Delta Verr$ as $\Delta VLD\_err = \Delta Verr$. Finally, the wavelength control circuit sets a new LD control voltage VLD_new given below to change the transmit wavelength of its own terminal station:

$$VLD\_new = VLD + \Delta VLD\_err$$

With this control, the potential difference from the neighboring terminal station on the VF axis is maintained to be $\Delta V$.

After the above-mentioned operation, operation 3 is repeated.

When the channel interval is maintained to be a predetermined interval while repeating operation 3, if the wavelength of the neighboring channel largely changes or disappears, the transmit wavelength of another terminal station can no longer be detected even when VF is swept up to $VL+\Delta V+\delta V$. In this case, the control returns to operation 2 to maintain the channel interval from the neighboring channel, which has changed largely or from a new neighboring channel to be a predetermined interval.

In this embodiment, transmission starts from the shorter wavelength side, and the transmit wavelength of each terminal station changes toward the longer wavelength side. However, transmission may start from the longer wavelength side, and the transmit wavelength may change toward the shorter wavelength side.

As described above, according to this embodiment, the entire available wavelength range of the filter can be used. As a result, even when the wavelengths of the LD vary over a broad range due to their individual differences, they can be used as light sources. Furthermore, since channels need not be assigned in advance, the channels can be effectively used. Since the channel interval is maintained to be a predetermined interval, a region where a channel can be generated can be effectively used. The predetermined channel interval can always be maintained irrespective of changes in external environment, and no absolute wavelength control such as temperature control is required.

(Another Embodiment)

The respective constituting elements are not limited to those described in the above embodiments as long as they have similar functions.

In the present invention and, especially, in the second embodiment that performs transmit wavelength tuning, a light emitting device capable of performing high-speed tuning is preferably used. In the above embodiment, a three-electrode $\lambda/4$ shift LD is used as the LD. However, any other light sources can be used as the light source of the present invention as long as they can continuously change their oscillation wavelengths. For example, a multi-electrode DBR (Distributed Bragg Reflector)-LD described in "1.55 $\mu$m WAVELENGTH TUNABLE FBH-DBR LASER", Electronics Letters, 1987, Vol. 23, No. 7, pp. 325–327 can be used. This device can perform high-speed tuning.

In the above embodiments, the FFP filter is used as an optical filter, which has a simple arrangement and can sweep the transmission wavelength over a broad range. However, any other optical filters can be used as long as they have periodic transmittance peaks and can continuously change the wavelength of the transmittance peak. For example, an FP etalon described in "Angle-Tuned Etalon Filters for Optical Channel Selection in High Density Wavelength Division Multiplexed Systems", Journal of lightwave technology, 1989, Vol. 7, No. 4, pp. 615–624 can be used. Also, a liquid crystal FP filter described in "Tunable Liquid-Crystal Fabry-Perot Interferometer Filter for Wavelength-Division Multiplexing Communication systems", Journal of lightwave technology, 1993, Vol. 11, No. 12, pp. 2033–2043 may be used.

Furthermore, as an optical filter, a dielectric multi-layered film filter may be used. In this case, the filter is prepared so that the wavelength interval of n transmission wavelengths $\lambda i (i=1, 2, \ldots, n)$ equals the FSR.

In the above embodiments, the wavelength interval (the wavelength interval of equivalent wavelengths) between two nearest neighbor wavelengths of equivalent wavelengths belonging to a single channel is equal to the wavelength interval FSR between adjacent transmittance peaks of the optical filter in the receiver. However, in the present invention, the wavelength interval between adjacent transmittance peaks need only be equal to a natural number multiple of the wavelength interval between adjacent equivalent wavelengths. However, in order to receive all the channels, the optical filter in the receiver must include at least the wavelength range for use in the system within its available wavelength range for use. In addition, the transmittance peak must be able to be swept within at least a smaller one of the wavelength interval of adjacent transmittance peaks of the optical filter in the receiver or the wavelength range for use in the system.

In the above embodiments, optical fibers are used as the optical transmission path. However, the present invention is not limited to this. For example, any other means where optical signals can exist such as an optical path using an optical system, a space, and the like can be used as the optical transmission path.

As described above, according to the present invention, the wavelength range for use in the system can be broadened without increasing the interval between adjacent transmittance peaks of the optical filter upon reception or widening the sweep range of the optical filter upon reception. In addition, a variation in oscillation wavelength of the light source can be permitted, and selection based on wavelengths can be obviated, thus increasing the yield.

What is claimed is:

1. An optical communication method for an optical communication system, which connects a plurality of optical nodes via an optical transmission path, and performs a communication by multiplying a plurality of channels in the optical transmission path, comprising the steps of:

performing transmission by the transmitting optical node using a wavelength belonging to a wavelength group constituting a single channel, wherein each of the plurality of channels is constituted by a wavelength group consisting of a plurality of wavelengths separated from each other by a predetermined first wavelength interval; and performing reception by the receiving optical node by matching light detectivity peaks of optical detection means, which detects light in the optical transmission path and has a plurality of detectivity peaks separated by intervals corresponding to a natural number multiple of the predetermined first wavelength interval, with the wavelengths constituting the wavelength group o a required channel;

wherein a wavelength range for use in the communication system is equal to or larger than the natural number multiple of the predetermined first wavelength interval.

2. A method according to claim 1, wherein wavelengths belong to different channels and nearest neighbor wavelengths are set to be separated from each other by at least a second wavelength interval that prevents interferences so that said wavelengths do not cause interferences.

3. A method according to claim 2, wherein a plurality of wavelengths are set to be separated by the second wavelength intervals to fall within the predetermined first wavelength interval, the plurality of wavelengths belonging to different channels.

4. A method according to claim 1, wherein different channels are assigned to the plurality of optical nodes.

5. A method according to claim 1, wherein the transmitting optical node comprises light detection means which detects light in the optical transmission path and has a plurality of detectivity peaks separated by the predetermined first wavelength intervals, sweeps a wavelength within at least the predetermined first wavelength interval using said light detection means to detect a channel in use, and performs transmission using a wavelength belonging to a wavelength group constituting a channel that does not cause any interferences with the detected channel in use.

6. A method according to claim 5, wherein the transmitting optical node detects, using said light detection means, channels in use in the optical transmission path and a transmit channel of the own optical node, detects an interval between the transmit channel of the own optical node and the channel, closest to the transmit channel of the own optical node, of the detected channels in use on the basis of the detected channels, and maintains the detected interval to be a predetermined interval by controlling a transmit wavelength of the own optical node.

7. An optical communication system, which connects a plurality of optical nodes via an optical transmission path, and performs a communication by multiplexing a plurality of channels in the optical transmission path, comprising:

an optical transmission path, a transmitting optical node, including:

transmission means for performing transmission using one wavelength in a wavelength group constituting one channel, wherein each of the plurality of channels is constituted by a wavelength group consisting of a plurality of wavelengths separated from each other by a predetermined first wavelength interval; and a receiving optical node, including:

light detection means for detecting light in said optical transmission path, said light detection means having a plurality of detectivity peaks separated by intervals corresponding to a natural number multiple of the predetermined first wavelength interval, and means for matching the light detectivity peaks of said light detection means with wavelengths constituting the wavelength group of a required channel;

wherein a wavelength range for use in the communication system is equal to or larger than the natural number multiple of the predetermined first wavelength interval.

8. A system according to claim 7, wherein wavelengths belong to different channels and nearest neighbor wavelengths are set to be separated from each other by at least a second wavelength interval that prevents interferences so that said wavelengths do not cause interferences.

9. A system according to claim 8, wherein a plurality of wavelengths are set to be separated by the second wavelength intervals to fall within the predetermined first wavelength interval, the plurality of wavelengths belonging to different channels.

10. A system according to claim 7, wherein the plurality of channels are assigned in units of transmitting optical nodes.

11. A system according to claim 7, wherein said light detection means comprises an optical filter which has periodic transmittance peaks, and can control the transmittance peaks while maintaining the periods of the peaks.

12. A system according to claim 7, wherein said transmitting optical node includes:

light detection means for detecting light in said optical transmission path, said light detection means having a plurality of detectivity peaks separated by the predetermined first wavelength intervals;

means for changing the light detectivity peaks of said light detection means while maintaining the predetermined first wavelength intervals, and said transmitting optical node has a function of detecting channels in use by sweeping said light detection means.

13. A system according to claim 12, wherein said transmitting optical node includes:

control means for controlling a transmit wavelength of the own optical node; and means for detecting channels in use in said optical transmission path and a transmit channel of the own node, detecting an interval between the transmit channel of the own optical node and the channel, closest to the transmit channel of the own optical node, of the detected channels in use on the basis of the detected channels, and maintaining the detected interval to be a predetermined interval by controlling a transmit wavelength of the own optical node.

14. A system according to claim 12, wherein said light detection means of said transmitting optical node comprises an optical filter which has periodic transmittance peaks, and can control the transmittance peaks while maintaining the periods of the peaks.

* * * * *

UNITED STATES PATENT AND TRADEMARK OFFICE
CERTIFICATE OF CORRECTION

PATENT NO. : 5,815,296

DATED : September 29, 1998

INVENTOR(S) : OUICHI KUBOTA

Page 1 of 2

It is certified that error appears in the above-identified patent and that said Letters Patent is hereby corrected as shown below:

On the title page,

Item [56] OTHER PUBLICATIONS:

In "Kotaki, et al.,", "vol., 23," should read --vol. 23,--.

IN THE DRAWINGS:

Sheet 7, Figure 9, "DICISION" should read --DECISION--.

COLUMN 5:

Line 7, "arrangement." should read --arrangement--.

COLUMN 7:

Line 21, "rarily" should read --rary--;
Line 48, "$\lambda f1$" should read --$\lambda 1$--; and
Line 49, "$\lambda f4$." should read --$\lambda 4$.--.

COLUMN 9:

Line 4, "$\lambda VF$" should read --$\Delta VF$--; and
Line 11, "$\Delta 80$." should read --$\Delta \lambda$.--.

COLUMN 11:

Line 18, "$\lambda 1to$" should read --$\lambda 1$ to--.

UNITED STATES PATENT AND TRADEMARK OFFICE
CERTIFICATE OF CORRECTION

PATENT NO. : 5,815,296

DATED : September 29, 1998

INVENTOR(S) : OUICHI KUBOTA

It is certified that error appears in the above-identified patent and that said Letters Patent is hereby corrected as shown below:

COLUMN 12:

Line 4, "$2\lambda V$" should read --$2\Delta V$--; and
Line 16, "$VF=Vam+\lambda V$" should read --$VF=Vam+\Delta V$--.

COLUMN 13:

Line 24, "$VF=VL+\Delta V+67V$" should read --$VF=VL+\Delta V+\delta V$--.

COLUMN 15:

Line 20, "o" should read --of--.

Signed and Sealed this

Eleventh Day of May, 1999

Attest:

Q. TODD DICKINSON

Attesting Officer

Acting Commissioner of Patents and Trademarks